United States Patent
Chen et al.

(10) Patent No.: US 7,991,117 B2
(45) Date of Patent: Aug. 2, 2011

(54) APPARATUS AND METHOD TO FACILITATE DYNAMICALLY ADJUSTING RADIATION INTENSITY FOR IMAGING PURPOSES

(75) Inventors: Gongyin Chen, Handerson, NV (US); Robert Edward Drubka, Scottsdale, AZ (US); Zane J. Wilson, Henderson, NV (US)

(73) Assignee: Varian Medical Systems, Inc., Palo Alto, CA (US)

( * ) Notice: Subject to any disclaimer, the term of this patent is extended or adjusted under 35 U.S.C. 154(b) by 250 days.

(21) Appl. No.: 12/352,974

(22) Filed: Jan. 13, 2009

(65) Prior Publication Data

US 2010/0177873 A1 Jul. 15, 2010

(51) Int. Cl.
*H05G 1/10* (2006.01)

(52) U.S. Cl. ............... 378/95; 378/108; 378/113

(58) Field of Classification Search .......... 378/62, 378/95, 98.7, 108–113, 138, 150–153, 162
See application file for complete search history.

(56) References Cited

U.S. PATENT DOCUMENTS

| 5,481,584 A | 1/1996 | Tang et al. | |
| 7,400,703 B2 * | 7/2008 | Yatsenko | 378/62 |
| 7,406,154 B2 * | 7/2008 | Resnick | 378/113 |
| 2004/0017890 A1 | 1/2004 | Arenson et al. | |
| 2007/0183568 A1 | 8/2007 | Kang et al. | |

FOREIGN PATENT DOCUMENTS

JP 2001141672 A1 5/2001

OTHER PUBLICATIONS

Chen, "Understanding X-Ray Cargo Imaging," Nuclear Instruments and Methods in Physics Research B 241 (2005), pp. 810-815.
Langeveld et al., "Intensity Modulated Advanced X-ray Source (IMAXS)," Rapiscan Systems product presentation; Jun. 5, 2008; 16 pages; applicants became aware of this on Jul. 10, 2008.
PCT Search Report from related PCT/US2010/020642; Aug. 31, 2010; 10 pages.

* cited by examiner

*Primary Examiner* — Jurie Yun
(74) *Attorney, Agent, or Firm* — Fitch Even Tabin & Flannery

(57) ABSTRACT

An x-ray-based radiation imaging apparatus (200) for use in imaging an object (201) can comprise a source of x-rays (202) having an output radiation intensity control input and a radiation intensity controller (207) operably coupled thereto. This radiation intensity controller can have a control output (209, 210) that is operably coupled to the output radiation intensity control input and an object information input (209). So configured, the radiation intensity controller can dynamically adjust radiation intensity as output by the source of x-rays as a function of information regarding the object itself.

20 Claims, 5 Drawing Sheets

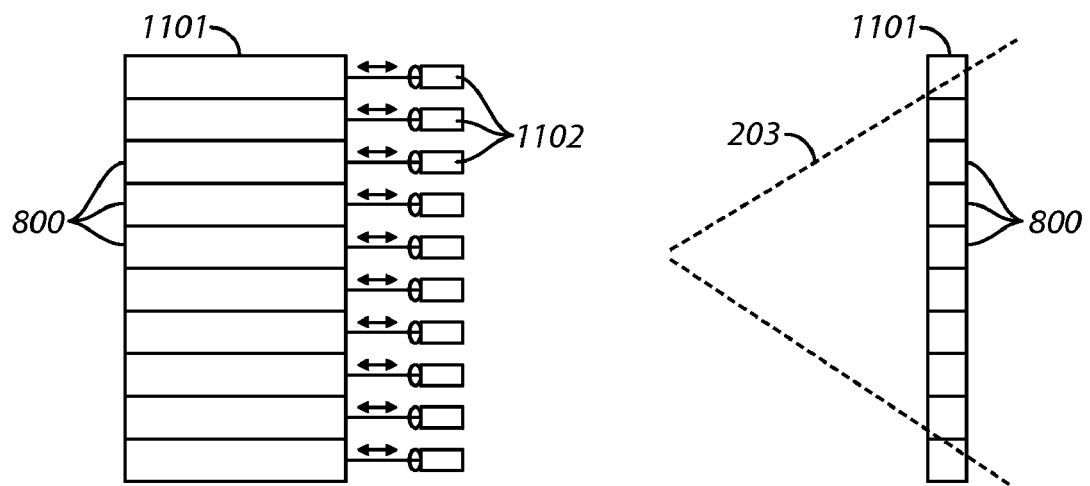
FIG. 11
FIG. 12
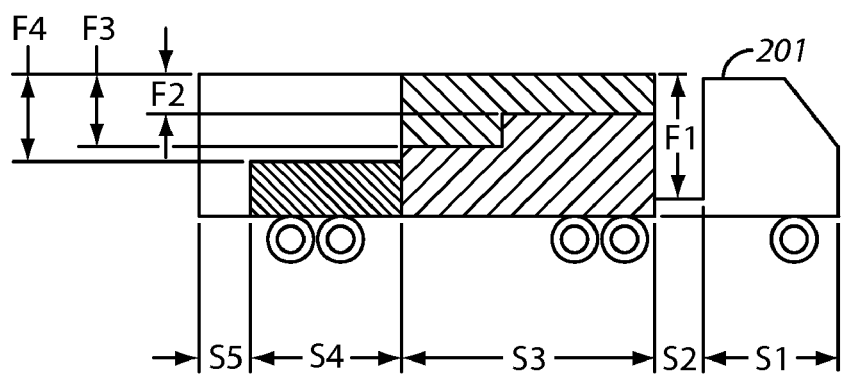
FIG. 13

APPARATUS AND METHOD TO FACILITATE DYNAMICALLY ADJUSTING RADIATION INTENSITY FOR IMAGING PURPOSES

TECHNICAL FIELD

This invention relates generally to x-ray-based imaging.

BACKGROUND

The use of x-rays to form corresponding images comprises a well-understood area of endeavor. Generally speaking, an object exposed to a beam of photons from an x-ray source will block (or not) some portion of those photons as a function of its electron-density and its thickness. A detector array then detects where the photons have been attenuated to a corresponding greater or lesser degree and a corresponding image can be formed.

In such cases, the amount of radiation used can comprise a significant concern. On the one hand, higher radiation doses often contribute to superior image quality and increased detail resolution. On the other hand, lower radiation doses pose fewer safety issues, both to the object being inspected and the local environs. In some application settings enough information is available regarding the object to be inspected (such as information regarding the material comprising the object, the dimensions and geometry of the object, and so forth) to permit the selection of a particular radiation dose by a human operator that represents a useful compromise between these competing interests. Other application settings, however, are not amenable to such an approach. Another related concern is that some application settings are based upon a specific radiation safety design that allows a certain amount of average radiation to be used for imaging. By using lower doses for less attenuating portions of the object, a higher dose can be applied to more attenuating portions, thereby improving imaging quality.

Cargo inspection stations are an illustrative example in this regard. In many cases, a tractor and trailer to be inspected in this manner have unknown contents. In other cases, the contents may be generally known, but their relative locations within the vehicle may be unknown. In yet other cases, the contents as described of record may not in fact accord with the actual contents of the vehicle. Using some maximum level of radiation to account for such variations and uncertainties can permit the contents, regardless of their make-up, to be suitably imaged but this, in turn, presents the aforementioned traditional trade-off; corresponding safety issues can loom largely in such a case and ultimately discourage the use of such an approach.

BRIEF DESCRIPTION OF THE DRAWINGS

The above needs are at least partially met through provision of the method and apparatus to facilitate dynamically adjusting radiation intensity for imaging purposes described in the following detailed description, particularly when studied in conjunction with the drawings, wherein:

FIG. 11 comprises a front-elevational schematic view as configured in accordance with various embodiments of the invention;

FIG. 12 comprises a side-elevational schematic view as configured in accordance with various embodiments of the invention; and FIG. 13 comprises a side elevational schematic view as configured in accordance with various embodiments of the invention.

Figure 1:
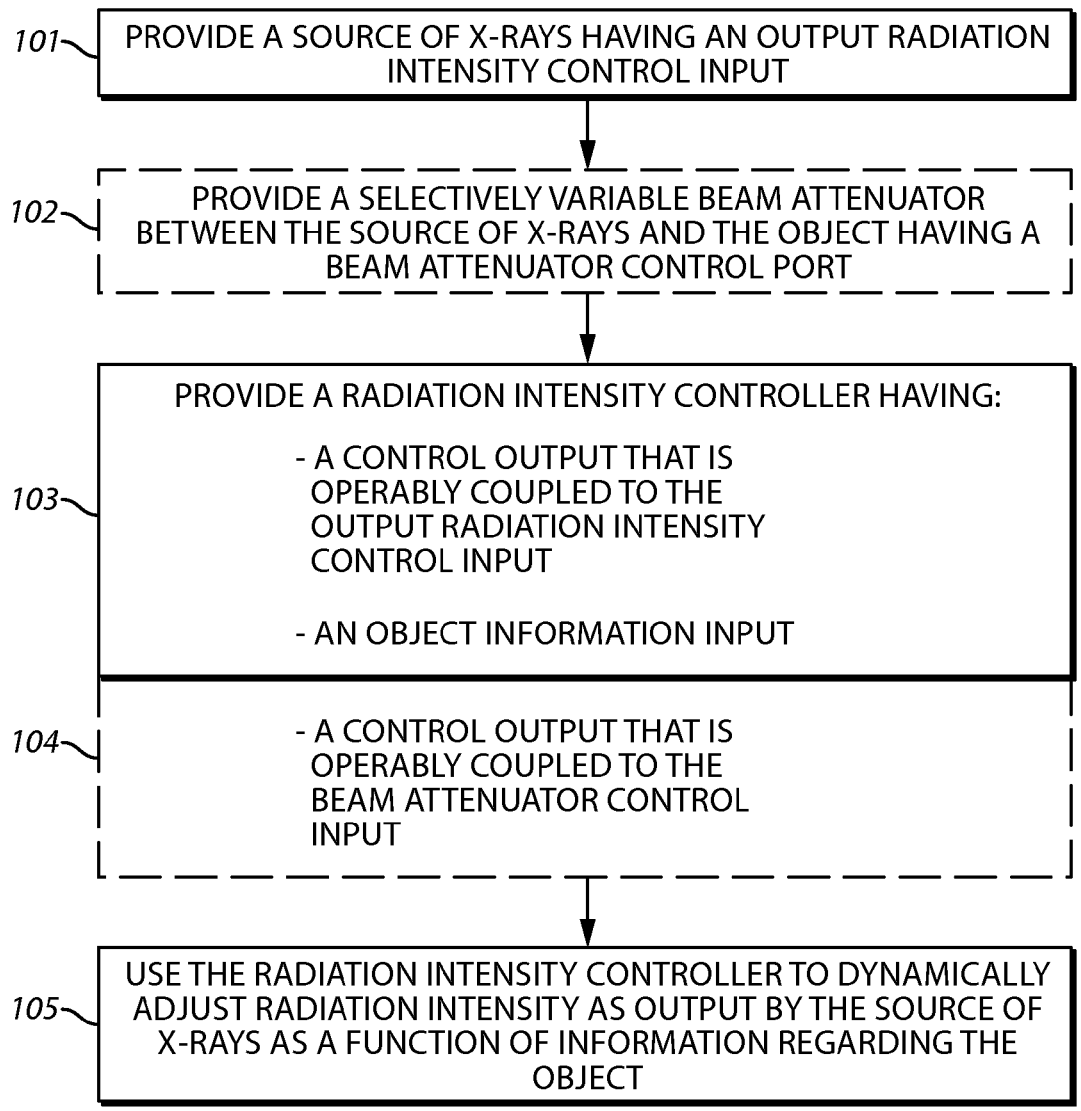
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an x-ray-based radiation imaging apparatus for use in imaging an object can comprise a source of x-rays having an output radiation intensity control input and a radiation intensity controller operably coupled thereto. This radiation intensity controller can have a control output that is operably coupled to the output radiation intensity control input and an object information input. So configured, the radiation intensity controller can dynamically adjust radiation intensity as output by the source of x-rays as a function of information regarding the object itself.

By one approach, this source of x-rays can comprise an accelerator, a radio frequency source that is operably coupled to the accelerator, and a particular source having a particle output that is also operably coupled to the accelerator. Pursuant to these teachings, the aforementioned radiation intensity controller can be configured to dynamically adjust radiation intensity as output by the source of x-rays by dynamically modifying a relative duration of time during which particles are provided to the accelerator from the particle source. By adjusting intensity in this manner, x-ray beam energy is not altered. This avoids unnecessary imaging artifacts and the need for complicated calibration as otherwise typifies prior art practice in these regards. By one approach, for example, this can comprise temporally shifting a pulse of the particles. By another approach, this can comprise modifying a length of a pulse of such particles, either alone or in combination with the aforementioned temporal shift.

By one approach, the aforementioned information regarding the object can comprise x-ray-based information regarding the object. For example, this x-ray-based information regarding the object can comprise information gleaned from a current in-process scan of the object.

As alluded to above, the radiation intensity controller can effect the described control of radiation intensity of the output of the source of x-rays in a direct manner by influencing the operation of the source of x-rays. These teachings will also accommodate, however, either alone or in conjunction the foregoing, indirect control of such intensity. By one approach, for example, the radiation intensity controller can control a selectively variable beam attenuator that is disposed between the source of x-rays and the object to be imaged. Such a beam attenuator can comprise, by way of example and not by way of limitation, a plurality of individually selectable and automatically movable radiation-attenuating blocks.

These teachings are readily implemented in a manner that permits the aforementioned adjustment of radiation intensity while nevertheless maintaining amplitudes of the radio frequency output and the particular output of the radio frequency source and the particular source substantially stable.

Such an apparatus can be usefully applied in an application setting that includes an object to be imaged that comprises unknown and/or varying contents. By one approach, for example, such an apparatus can be configured to dynamically adjust radiation intensity as used to image the object by tending to increase the radiation intensity, when possible, when the object information corresponds to a portion of the object that comprises high attenuation material while also tending to decrease the radiation intensity, when possible, when the x-ray-based information corresponds to a portion of the object that comprises low attenuation material.

Those skilled in the art will recognize and appreciate that these teachings permit a dynamic and useful compromise to be automatically made, on the fly, when imaging objects that comprise unknown and likely varying materials and objects of varying dimensions. In particular, these teachings are readily applied to tend to ensure that a sufficient amount of radiation is used to garner useful images of the object while also tending to ensure that the amount of radiation used remains low where possible. Such an approach can reduce numerous concerns in these regards. Those skilled in the art will also recognize that these teachings can be readily applied in conjunction with existing platforms and methods to thereby greatly leverage their further use and applicability. It will also be recognized and appreciated that these teachings are highly scalable and can be applied in conjunction with a wide variety of platforms, methods, objects to be imaged, and application settings.

Figure 2:
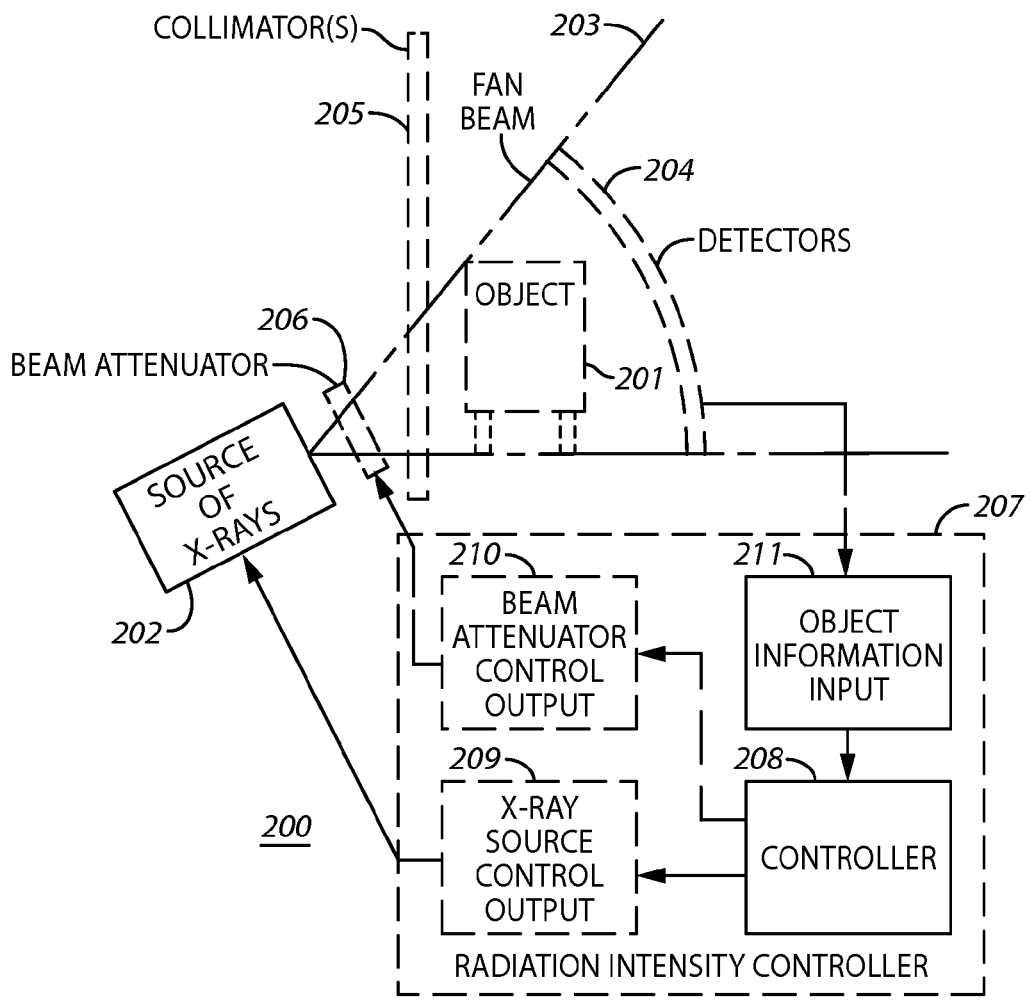
FIG. 2 comprises a schematic block diagram as configured in accordance with various embodiments of the invention.

These and other benefits may become clearer upon making a thorough review and study of the following detailed description. Referring now to the drawings, and in particular to FIGS. 1 and 2, an illustrative process and apparatus that are compatible with many of these teachings will now be presented.

This process 100 includes the step 101 of providing a source of x-rays 202. This source of x-rays 202 can comprise a part of an x-ray-based radiation imaging apparatus 200 that is configured for use in imaging an object 201. For the sake of illustration and not by way of limitation, this object 201 comprises, in this example, a trailer-bearing truck. This source of x-rays 202 has an output radiation intensity control input and, generally speaking, is oriented to direct its output radiation 203 towards the aforementioned object 201. For the purposes of this explanation this output radiation 203 comprises a fan beam as is known in the art. Those skilled in the art will recognize that other possibilities exist in this regard and that these teachings are not limited to use with only a fan beam.

As known in the art, x-ray beams are often described in terms of the accelerating potential used to accelerate electrons to strike a target and create x-ray photons. Thus, as used in the art and herein, a 6 MV beam, for example, refers to a beam created using a potential of 6 MV to accelerate electrons into a target. Such electrons would achieve an energy of approximately 6 MeV. The resulting photon beam has an energy spread referred to as "Bremsstrahlung" radiation that is characteristic of the energy of the accelerating electrons. Typically, the energy ranges from near zero to near that of the electron beam, with an average about one third the energy of the electron beam.

Figure 3:
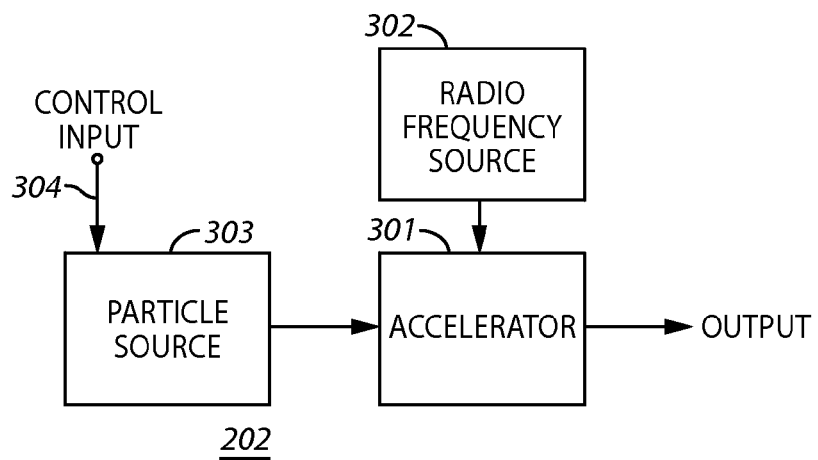
FIG. 3 comprises a block diagram as configured in accordance with various embodiments of the invention.

Referring momentarily to FIG. 3, this source of x-rays 202 can itself comprise an accelerator 301, a radio frequency source 302, and a particle source 303 (such as an electron gun). Both the radio frequency source 302 and the particle source 303 operably couple to the accelerator in accordance with well-understood prior art technique in this regard in order to yield the desired radiation via the accelerator's output. In this particular example, however, the particle source 303 further comprises a control input 304 that serves as the aforementioned output radiation intensity control input.

Figure 4:
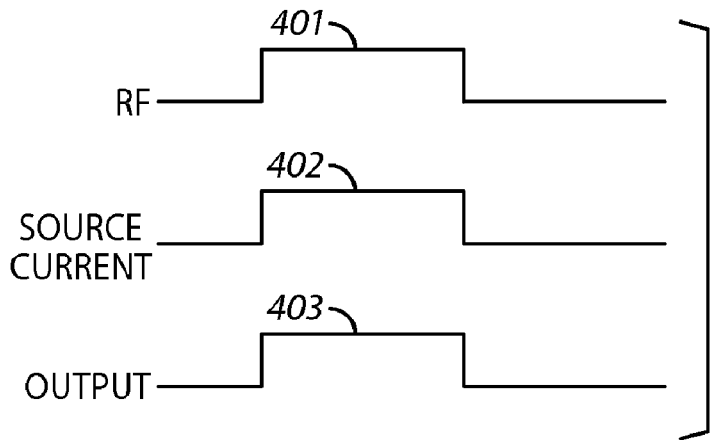
FIG. 4 comprises a timing diagram as configured in accordance with the prior art.

Referring now to FIG. 4 (and also in accordance with well-understood prior art technique in this regard), the radio frequency source 302 can output a radio frequency signal 401 that the accelerator 301 uses to accelerate the particles that comprise an incoming source current 402 from the particle source 303. This yields, in turn, a pulse of radiation 403 that serves as the output of the accelerator 301. In accordance with prior art technique the durations of the radio frequency signal 401 and of the source current 402 essentially match, both in length and in synchronicity to yield an output radiation pulse 403 having similar timing.

The described source of x-rays 202 can of course serve as just described to provide what amounts to a maximum-intensity dose of radiation. The present teachings also contemplate, however, controlling the source of x-rays to permit doses having reduced intensity by way of comparison.

Figure 5:
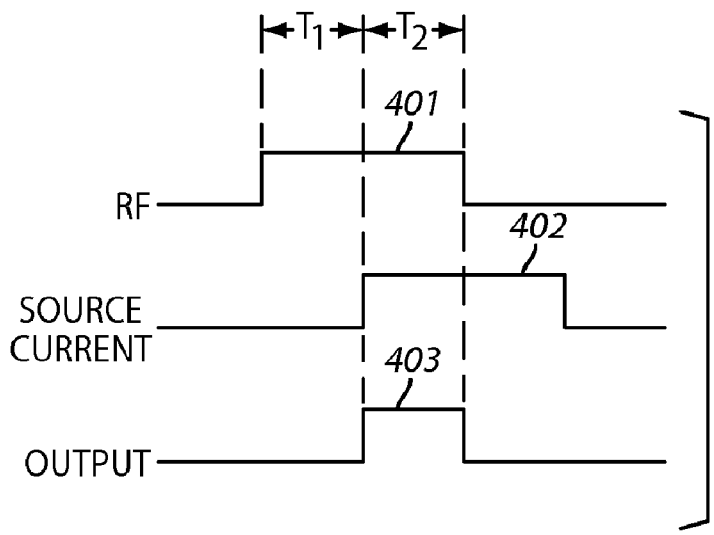
FIG. 5 comprises a timing diagram as configured in accordance with various embodiments of the invention.

By one approach, this control can comprise temporally shifting when a pulse of particles is provided to the accelerator 301 by the particular source 303. FIG. 5 provides an illustrative example in this regard. Here, the radio frequency pulse 401 has the same duration and overall timing as in the example described above for FIG. 4. The source current pulse 402, however, has been temporally shifted. In particular, this pulse 402 now lags the radio frequency pulse 401 by T1. As a result, the accelerator 301 only outputs a radiation pulse 403 for a period of time T2 that represents the time when the source current 402 is available to be accelerated by the radio frequency pulse 401 (which essentially equates to that time when the radio frequency pulse 401 and the source current pulse 402 overlap with one another). The net result, of course, is a resultant x-ray pulse having a reduced intensity as compared to the pulse that results when the two incoming pulses are exactly coincident with one another.

In the example just provided, the resultant x-ray pulse intensity is reduced by causing the source current pulse 402 to somewhat lag the radio frequency pulse 401. Those skilled in the art will appreciate that one can achieve exactly the same result by causing the source current pulse 402 to lead the radio frequency pulse 401 by a similar amount. In either case, the total duration of the output pulse 403 is similarly reduced, hence reducing the corresponding intensity of the outbound x-ray pulse. It will also be understood that it is the relative temporal difference between the source current 402 and the radio frequency pulse 401 that achieves this result and that such a relative difference can be similarly caused by temporally manipulating the radio frequency pulse 401 rather than the source current 402 or by manipulating both of these incoming signals to achieve the desired amount of overlap to thereby attain a particular output intensity. In a typical application setting, however, it will likely be more convenient and reasonable to manipulate the source current pulse 402 in these ways rather than the radio frequency pulse 401.

Figure 6:
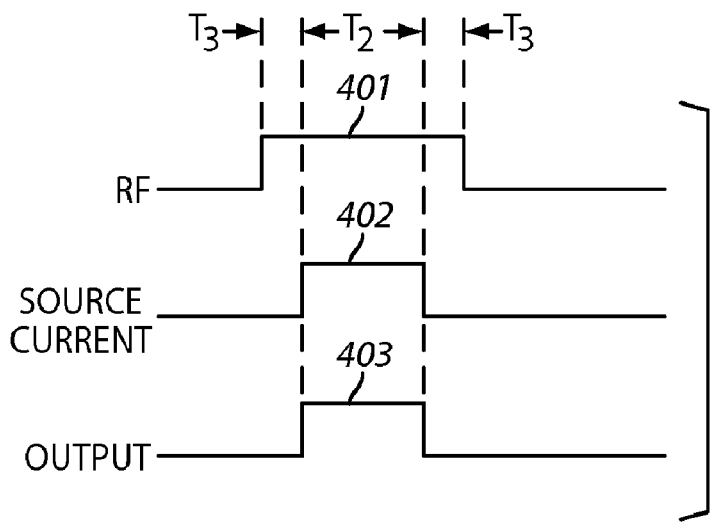
FIG. 6 comprises a timing diagram as configured in accordance with various embodiments of the invention.

Referring now to FIG. 6, yet another way to achieve such results comprises dynamically modifying the length of the pulse of particles 402. In the illustrative example shown, this pulse 402 has been reduced by T3 on both its leading and trailing edge to thereby yield a pulse 402 having an overall duration of T2. This, in turn, will again lead to a corresponding output pulse 403 that also has a duration of T2.

Those skilled in the art will appreciate that yet further permutations and combinations in these regards can be pursued if desired. For example, if desired, one could shorten the length of the particular pulse 402 by T3 and also delay that pulse 402 by a similar amount (as compared to the radio frequency pulse 401) to again achieve an output pulse 403 having the desired T2 duration. By these teachings it will be readily understood and appreciated that a wide range of radiation intensity can be readily achieved on a pulse-by-pulse basis. It will also be recognized that these teachings achieve these results will also maintaining the amplitudes of the both the radio frequency output and the particle output substantially stable.

Referring again to FIGS. 1 and 2, and in addition to having detectors 204 to detect the interaction of the x-rays 203 with the object 201 and, optionally, one or more collimators 205 (all in accordance with well-understood prior art technique) this process 100 can also optionally include the step 102 of providing a selectively variable beam attenuator 206 between the source of x-rays 202 and the object 201. (It will be understood by those skilled in the art that the aforementioned collimator 205 can be located following the beam attenuator 206 as shown in FIG. 2 or can be located before the beam attenuator 206. It would also be possible to provide collimators on both sides of the beam attenuator 206 and/or to provide a plurality of collimators on either side of the beam attenuator 206.) This selectively variable beam attenuator 206 has a beam attenuator control input that operably couples to a radiation intensity controller 207 that is disclosed below in detail.

In the illustration provided, the collimator 205 and the beam attenuator 206 are depicted as being linearly oriented while the detectors 204 are depicted as having a curved form factor. These teachings will readily accommodate numerous changes in these regards. It would be possible, for example, for either (or both) of the collimator 205 and the beam attenuator 206 to have a curved form factor and/or for the detectors 204 to be linearly oriented. Accordingly, it will be understood and recognized that that the scope of these teachings is not limited to the particular embodiments shown in these regards.

Figure 7:
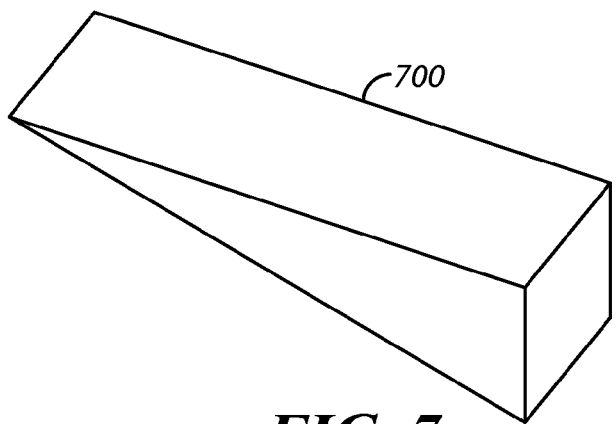
FIG. 7 comprises a perspective view as configured in accordance with various embodiments of the invention.

By one approach, this selectively variable beam attenuator 206 can comprise a plurality of individually selectable and automatically movable radiation-attenuating blocks. Referring momentarily to FIG. 7, and as one illustrative example in these regards, such a radiation-attenuating block 700 can comprise a wedge-shaped block of material, such as tungsten or hardened lead, that will tend to attenuate x-ray radiation.

Figure 8:
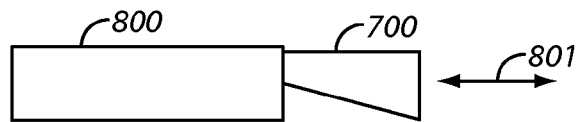
FIG. 8 comprises a top plan view as configured in accordance with various embodiments of the invention.

As shown in FIG. 8, such a radiation-attenuating block 700 can be sized and configured to readily move back and forth (as denoted by the arrow bearing reference numeral 801) within a corresponding block pathway 800. So configured, by essentially removing the radiation-attenuating block 700 from within this block pathway 800 an x-ray can pass through the block pathway 800 without encountering the attenuating properties of that radiation-attenuating block 700. Similarly, by fully disposing the radiation-attenuating block 700 within this block pathway 800, a considerable amount of attenuation can be presented.

The amount of attenuation offered by a single such radiation-attenuating block 700 will of course vary with such parameters as the material that comprises the block 700, the relative depth/thickness of the block 700, and so forth. The block pathway 800, in turn, can be formed as an enclosed housing if desired, or as a partially or fully-exposed and open framework. The material that comprises the block pathway 800 can be selected, if desired, to present very little radiation attenuation. A light plastic material, for example, may suffice well in these regards for many application purposes.

Figure 9:
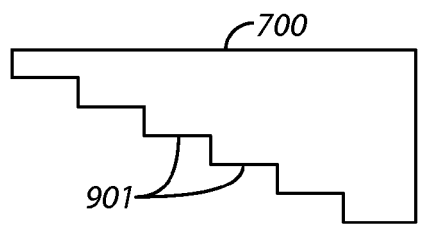
FIG. 9 comprises a top plan view as configured in accordance with various embodiments of the invention.
Figure 10:
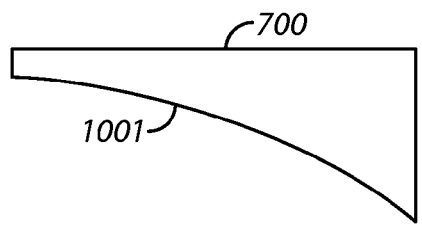
FIG. 10 comprises a top plan view as configured in accordance with various embodiments of the invention.

In the illustrative example provided above, the radiation-attenuating block 700 has a straight (albeit angled) lower edge. These teachings will readily accommodate other possibilities in these regards, however. As one example in this regard, and as illustrated in FIG. 9, this lower edge can comprise a series of steps 901. As another example in this regard, and as illustrated in FIG. 10, this lower edge can comprise a curved surface 1001 (either convex as shown or concave, as desired). Those skilled in the art will recognize that these examples are intended for illustrative purposes only and are not intended to comprise an exhaustive offering in these regards.

In the examples provided above, it is the lower edge of the radiation-attenuating block 700 that bears the purpose of reducing the height of the block 700 over its length. Other possibilities of course exist here as well. As one simple example in these regards, the block 700 could simply be turned 180 degrees. In such a case, it will be the upper edge of the radiation-attenuating block 700 that will now have this feature and purpose.

As noted above, the selectively variable beam attenuator 206 can comprise a plurality of such radiation-attenuating blocks 700. Referring now to FIGS. 11 and 12, this can comprise arranging a stack 1101 of block pathways 800 one atop the other. FIG. 11 provides a view of such a stack 1101 from the point of view of the source of x-rays 202 while FIG. 12 provides a side view in these same regards. To facilitate the selective movement of selected ones of these radiation-attenuating blocks 700, each such block 700 can be operably coupled to a corresponding motor 1102. Such a coupling might comprise, for example, the use of a worm gear to convert the rotational output of the motor 1102 into translational movement that can serve to move the radiation-attenuating blocks 700 back and forth to desired positions within their respective block pathways 800. Various ways of achieving this result are well known and understood in the art. As these teachings are not overly sensitive to any particular selection in this regard, for the sake of brevity and the preservation of clarity, further elaboration in this regard will not be presented here.

So configured, specific portions of the x-ray fan beam can be selectively attenuated to a greater or lesser degree in order to reduce radiation intensity within specific portions of the fan beam. This capability therefore comprises a second way of controlling radiation intensity as output by the source of x-rays 202 that can be used alone, or in combination with, the aforementioned source of x-rays having a selectively controllable output radiation intensity.

Referring again to FIGS. 1 and 2, this process 100 also includes the step 103 of providing a radiation intensity controller 207. This radiation intensity controller 207 comprises a controller 208 that operably couples to an x-ray source control output 209 that in turn couples to the output radiation intensity control input of the source of x-rays. In this illustrated embodiment, this comprises a connection to a control input as comprises a part of the source of x-rays 202 itself.

As noted above, these teachings will also accommodate providing a selectively variable beam attenuator 206. In such a case, the radiation intensity controller 207 can also then comprise a beam attenuator control output 210 that operably couples to both the controller 208 and the selectively variable beam attenuator 206 to thereby facilitate control of the latter. By one approach, for example, this beam attenuator control output 210 can comprise a plurality of outputs that each couple to a corresponding motor 1102 to thereby control the on/off state of each such motor 1102 and its corresponding direction of rotation to thereby control the extent to which the aforementioned radiation-attenuating blocks 700 are disposed in an x-ray occluding position.

This radiation intensity controller 207 also comprises an object information input 209 that also operably couples to the controller 208. By one approach, this object information input 209 is configured to receive x-ray-based information regarding the object. A non-limiting example in this regard would be x-ray attenuation information such as information regarding the overall reduction of photons as they interact with the object 201. Such information can be provided, for example, by the aforementioned detectors 204. In such a case, this object information input 209 can be operably coupled to receive a standard and/or customized output as provided by these detectors 204.

The temporal currency of this x-ray-based information regarding the object 201 can vary with the application setting. In some cases, for example, it may be useful and acceptable to refer to historical, archived information regarding this specific object 201. In other cases, it may be useful and acceptable to refer to some categorical information that, while not specific to this particular object 201, is nevertheless sufficiently representative to permit such usage.

That said, in many application settings it will be useful instead for this information regarding the object to comprise information that is gleaned from a current in-process scan of the object 201. In a typical application setting, for example, a large object will be exposed to a series of x-ray pulses as relative motion occurs between the object and the source of x-rays. In such a case, the composite and aggregated result then serves as a complete view of the object. In such an application setting, the intensity of each x-ray pulse can be dynamically adjusted (using, for example, the aforementioned adjustable source of x-rays 202 and/or the selectively variable beam attenuator 206) based upon attenuation information gleaned from a just previous pulse or some selected number of such previous pulses. Further discussion in these regards appears below where appropriate.

As noted earlier, this process 100 will accommodate optionally providing a selectively variable beam attenuator 206. Presuming the availability of such an attenuator 206, this step 103 of providing a radiation intensity controller can further then optionally comprise the embellishment 104 of providing a radiation intensity controller having a beam attenuator control output 210 that is operably coupled to the beam attenuator control input. So configured, the radiation intensity controller 207 can selectively control, for example, the disposition of the aforementioned radiation-attenuating blocks 700 with respect to their corresponding block pathways 800. This, in turn, will serve to controllably attenuate those portions of the x-ray fan beam that must encounter those blocks 700 to a greater or a lesser degree.

So configured, this process 100 then supports the step 105 of using the radiation intensity controller 207 to dynamically adjust radiation intensity as output by the source of x-rays 202 as a function of the information regarding the object 201. As will be clear to those skilled in the art, this can comprise directly controlling the intensity of such radiation by controlling the source of x-rays 202 itself (for example, via modification of the pulses of particles as are provided by a current source 303 as comprises a part of the source of x-rays 202 by temporally shifting and/or altering the length of such pulses), indirectly controlling the intensity of such radiation via the selectively variable beam attenuator 206, or both as desired.

Those skilled in the art will recognize and appreciate that the aforementioned controller 208 can comprise a fixed-purpose hard-wired platform or can comprise a partially or wholly programmable platform. All of these architectural options are well known and understood in the art and require no further description here. Regardless, by one approach, this controller 208 can be programmed (using, for example, corresponding programming as will also be well understood by those skilled in the art) to carry out the aforementioned dynamic adjustment of the radiation intensity as output by the source of x-rays 202.

As noted, this dynamic control is based, at least in part, upon information regarding the object 201. Also as noted, for at least some application settings this information can comprise x-ray-based information such as x-ray attenuation information. In such a case, this dynamic control can generally comprise tending to increase the radiation intensity (when possible) when the x-ray-based information corresponds to a portion of the object that comprises high attenuation material. Similarly, this dynamic control can also generally comprise tending to decrease the radiation intensity (when possible) when the x-ray-based information corresponds to a portion of the object that comprises low attenuation material. (These references to "when possible" will be understood to refer to a physical or operational ability to increase or decrease radiation intensity; for example, when the source of x-rays 202 is already set to its maximum output intensity, it is no longer possible to increase that intensity further. The use of the word "tending" will, in turn, be understood to refer to a general course of behavior that does not necessarily require an incremental increase (or decrease) with each and every pulse or decision-making opportunity.)

It will also be understood that these teachings will accommodate a wide range of approaches to increasing and decreasing radiation intensity. By one approach, such a change can be permitted (or even encouraged) with each and every pulse. By another approach, a given intensity might be pre-selected for use with some specific number of consecutive pulses (such as, for example, three pulses, ten pulses, or the like). The amount by which the intensity is increased or decreased is also subject to a wide range of possibilities. For example, if desired, such dynamic changes can be made amongst only three possible intensity settings—a low setting, a medium setting, and a high setting. It would also be possible, however, to divide the operating range of available intensities into smaller increments, such that, for example, the intensity might be increased/decreased by a relatively small amount with each such dynamic change.

Referring now to FIG. 13, an illustrative example in these regards will be provided. Those skilled in the art will recognize and understand that this example is intended to serve only in an illustrative capacity and is not intended to comprise an exhaustive listing of all possibilities in this regard.

In this example, the object 201 comprises a truck that is towing a trailer. The entire object 201 is to be scanned using pulsed x-rays that are presented as a fan beam. The scan begins with the front of the object 201 and moves incrementally to the rear of the object 201.

For that portion of the object 201 denoted as S1, the aforementioned information regarding the object 201 will reveal a considerable presence of material that highly attenuates the x-rays (for example, the engine and the transmission). This being so, the radiation intensity controller 207 can cause the source of x-rays 202 to generate full-intensity output doses to thereby best ensure that suitable images are formed.

As the scan moves rearwardly and enounters that portion of the object 201 denoted as S2, however, the information regarding the object 201 will change considerably due to the greatly reduced presence of highly attenuating material. During this portion of the scan, then, the radiation intensity controller 207 can cause the source of x-rays 202 to reduce the intensity of the output radiation as less intense radiation will still nevertheless suffice to ensure the capture of suitable images.

In this example, that portion of the trailer which is denoted as S3 contains cargo that comprises material that will greatly attenuate x-ray emissions. This is of course represented in the information regarding the object 201 and this, in turn, is used by the radiation intensity controller 207 as a basis for adjusting upwardly the radiation intensity. Depending upon the depth of attenuation and also upon the magnitude of S3, this can continue until the source of x-rays 202 again reaches its maximum output intensity.

In that portion of the trailer denoted by S4, however, the cargo is comprised of material that presents only moderate attenuation. As this circumstance becomes reflected in the information regarding the object 201, the radiation intensity controller 207 can again dynamically adjust the intensity of the x-rays downwardly to an appropriate level, again via appropriate direct control of the source of x-rays 202 itself.

In the concluding portion of the trailer (denoted as S5) there is very little attenuating material. As this becomes known to the radiation intensity controller 207 via the information regarding the object 201, the radiation intensity can be dynamically adjusted downwardly, perhaps to a least intense dosage level.

In the described actions just related, the radiation intensity controller 207 only utilizes the source of x-rays 202 itself to effect the desired control over the intensity of the resultant x-rays. If desired, a similar result can be effected through use of the selectively variable beam attenuator 206. By moving all of the blocks 700 that comprise this attenuator, the full extent of the fan beam can be similarly attenuated to a greater or lesser degree depending upon the depth to which the blocks 700 are moved into and out of the path of the fan beam.

This selectively variable beam attenuator 206 can also serve, however, in a different albeit somewhat related manner. In particular, for any given intensity that may be selected via direct control of the source of x-rays 202, the selectively variable beam attenuator 206 can be used to attenuate only selected portions of the fan beam in order to permit the application of x-rays in some portions of the object 201 while reducing or blocking the application of x-rays in other portions of the object 201.

To illustrate, that portion of the object 201 denoted by F1 comprises an air gap. This, too, can be ascertained via the aforementioned information regarding the object 201. This, in turn, can be used by the radiation intensity controller 207 to cause the selectively variable beam attenuator 206 to block the bulk of the upper portion of the fan beam while permitting the lower portion of the fan beam to proceed unattenuated.

In that portion of the object 201 denoted by F2, the corresponding upper portion of the cargo presents less attenuation than the lower portion of the same cargo area. Ascertaining this via the information regarding the object 201, the radiation intensity controller 207 can readjust the blocks 700 in the selectively variable beam attenuator 206 to reduce (though not fully attenuate) radiation in the upper part of the fan beam while allowing the lower portion of the fan beam to pass without attenuation in the attenuator 206. A similar readjustment can occur when the makeup of the cargo again changes where denoted by F3. Here, the blocks 700 are again readjusted to further partially attenuate a greater portion of the fan beam in order to accommodate the reduced quantity of highly attenuating cargo in the lower portion of the trailer.

Similarly, the selectively variable beam attenuator 206 can be readjusted again as the scan moves further to the rear of the object 201 and encounters the area denoted F4 where there is no cargo on top of moderately attenuating cargo. In this setting, the radiation intensity controller 207 can adjust the selectively variable beam attenuator 206 to reduce the upper portions of the fan beam to the maximum extent allowed by the attenuator piece(s).

By using these radiation intensity reduction techniques in tandem with one another, these teachings permit the modulation of radiation intensity in two dimensions. In particular, beam intensity as delivered by the source of x-rays 202 can be modulated to accommodate the most attenuating item in the fan beam. The presence and location of other portions of the beam field that contain less attenuating content can then be used to adjust the selectively variable beam attenuator 206 to further control the intensity of the delivered radiation in various portions of the fan beam.

Images generated via these teachings may benefit from compensation for the making of such dynamic adjustments, essentially in real time. For example, a normalization technique of choice may be useful to ensure an even presentation of the image notwithstanding considerable variations in the intensity of the radiation employed to obtain various portions of the image.

For many application settings it can be useful to pre-calibrate the components that comprise the beam attenuator 206. The blocks 700 can be moved across the fan beam and the x-ray attenuation at each digitized location then calculated from the corresponding detector signals (which may comprise, if desired, both the imaging detectors as noted above as well as one or more reference detector). The resulting calibration data (typically one set for each attenuator piece) are stored and recalled as appropriate to determine a required block 700 position based on the degree of x-ray attenuation desired for a particular corresponding portion of the fan beam.

So configured, these teachings permit great and real time dynamic control with respect to the overall intensity of an x-ray beam as well as partitioned selective control regarding reductions in that intensity in selected portions of that x-ray beam. These teachings are highly scalable and will accommodate a wide variety of application settings. Those skilled in the art will also recognize and appreciate that these teachings can be implemented in an economical manner.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one simple example in these regards, the teachings set forth herein are potentially applicable in medical settings (in conjunction with, for example, medical radiography). As another example in these regards, these teachings are readily applied in conjunction with other than a fan beam. For example, these teachings can be readily applied in use with cone beam geometry. In such a case, for example, the selectively variable beam attenuator can comprise two stacks of blocks, one stack being disposed at a right angle to the other. This will permit, at the least, partitioned beam attenuation in two dimensions. As one more example in these regards, these teachings are also applicable to tomography. And as yet another example in these regards, those skilled in the art will recognize that the teachings set forth here in regarding the direct control of a source of x-rays are applicable to a wide variety of sources, including standing wave x-ray radio frequency Linacs, traveling wave radio frequency Linacs, Cyclatrons, synchrotrons, RFQ accelerators, electrostatic accelerators, and so forth.

We claim:

1. An x-ray-based radiation imaging apparatus for use in imaging an object, the apparatus comprising:
   a source of x-rays having an output radiation intensity control input, wherein the source of x-rays comprises:
      an accelerator;
      a radio frequency source having a radio frequency output operably coupled to feed the accelerator;
      a particle source having a particle output operably coupled to the accelerator;
   a radiation intensity controller having:
      a control output that is operably coupled to the output radiation intensity control input; and
      an object information input;
   wherein the radiation intensity controller is configured to dynamically adjust radiation intensity as output by the source of x-rays as a function of information regarding the object.

2. The x-ray-based radiation imaging apparatus of claim 1 wherein:
   the radiation intensity controller is configured to dynamically adjust radiation intensity as output by the source of x-rays as a function of information regarding the object by dynamically modifying a relative duration of providing particles to the accelerator from the particle source.

3. The x-ray-based radiation imaging apparatus of claim 2 wherein the particle source is configured to dynamically modify the relative duration of providing particles to the accelerator from the particle source by temporally shifting when a pulse of particles is provided by the particle source to the accelerator.

4. The x-ray-based radiation imaging apparatus of claim 2 wherein the particle source is configured to dynamically modify the relative duration of providing particles to the accelerator from the particle source by dynamically modifying a length of a pulse of particles as is provided by the particle source to the accelerator.

5. The x-ray-based radiation imaging apparatus of claim 2 wherein the radiation intensity controller is configured to dynamically adjust the radiation intensity while maintaining amplitudes of the radio frequency output and the particle output substantially stable.

6. The x-ray-based radiation imaging apparatus of claim 1 wherein the object information input is configured to receive x-ray-based information regarding the object.

7. The x-ray-based radiation imaging apparatus of claim 6 wherein the x-ray-based information regarding the object comprises information gleaned from a current in-process scan of the object.

8. The x-ray-based radiation imaging apparatus of claim 7 wherein the radiation intensity controller is configured to dynamically adjust the radiation intensity by:
   tending to increase the radiation intensity, when possible, when the x-ray-based information corresponds to a portion of the object that comprises high attenuation material; and
   tending to decrease the radiation intensity, when possible, when the x-ray-based information corresponds to a portion of the object that comprises low attenuation material.

9. The x-ray-based radiation imaging apparatus of claim 1 further comprising:
   a selectively variable beam attenuator that is disposed between the source of x-rays and the object, wherein the selectively variable beam attenuator has a beam attenuator control input that is operably coupled to the radiation intensity controller;
   and wherein the radiation intensity controller is configured to dynamically adjust radiation intensity as passes through the selectively variable beam attenuator as a function of information regarding the object.

10. The x-ray-based radiation imaging apparatus of claim 9 wherein the selectively variable beam attenuator comprises a plurality of individually selectable and automatically movable radiation-attenuating blocks.

11. A method for use in imaging an object, the method comprising:
   providing a source of x-rays having an output radiation intensity control input, the source of x-rays comprising:
      an accelerator;
      a radio frequency source having a radio frequency output operably coupled to feed the accelerator; and
      a particle source having a particle output operably coupled to the accelerator;
   providing a radiation intensity controller having:
      a control output that is operably coupled to the output radiation intensity control input; and
      an object information input;
   using the radiation intensity controller to dynamically adjust radiation intensity as output by the source of x-rays as a function of information regarding the object.

12. The method of claim 11 wherein:
   using the radiation intensity controller to dynamically adjust radiation intensity as output by the source of x-rays as a function of information regarding the object comprises dynamically modifying a relative duration of providing particles to the accelerator from the particle source.

13. The method of claim 12 wherein using the particle source to dynamically modify the relative duration of providing particles to the accelerator from the particle source comprises temporally shifting when a pulse of particles is provided by the particle source to the accelerator.

14. The method of claim 12 wherein using the particle source to dynamically modify the relative duration of providing particles to the accelerator from the particle source comprises dynamically modifying a length of a pulse of particles as is provided by the particle source to the accelerator.

15. The method of claim 12 wherein using the radiation intensity controller comprises dynamically adjusting the radiation intensity while maintaining amplitudes of the radio frequency output and the particle output substantially stable.

16. The method of claim 11 wherein the object information input is configured to receive x-ray-based information regarding the object.

17. The method of claim 16 wherein the x-ray-based information regarding the object comprises information gleaned from a current in-process scan of the object.

18. The method of claim 17 wherein using the radiation intensity controller to dynamically adjust the radiation intensity comprises:
  tending to increase the radiation intensity, when possible, when the x-ray-based information corresponds to a portion of the object that comprises high attenuation material; and
  tending to decrease the radiation intensity, when possible, when the x-ray-based information corresponds to a portion of the object that comprises low attenuation material.

19. The method of claim 11 further comprising:
  providing a selectively variable beam attenuator between the source of x-rays and the object, wherein the selectively variable beam attenuator has a beam attenuator control input that is operably coupled to the radiation intensity controller;
and wherein using the radiation intensity controller further comprises dynamically adjusting radiation intensity as passes through the selectively variable beam attenuator as a function of information regarding the object.

20. The method of claim 19 wherein dynamically adjusting radiation intensity as passes through the selectively variable beam attenuator comprises adjusting selected ones of a plurality of individually selectable and automatically movable radiation-attenuating blocks.

* * * * *